Aug. 14, 1923.
W. S. KINSLEY
1,465,050
MIXING AND CLEANSING APPARATUS FOR TEXTILE STOCK
Filed June 3, 1922
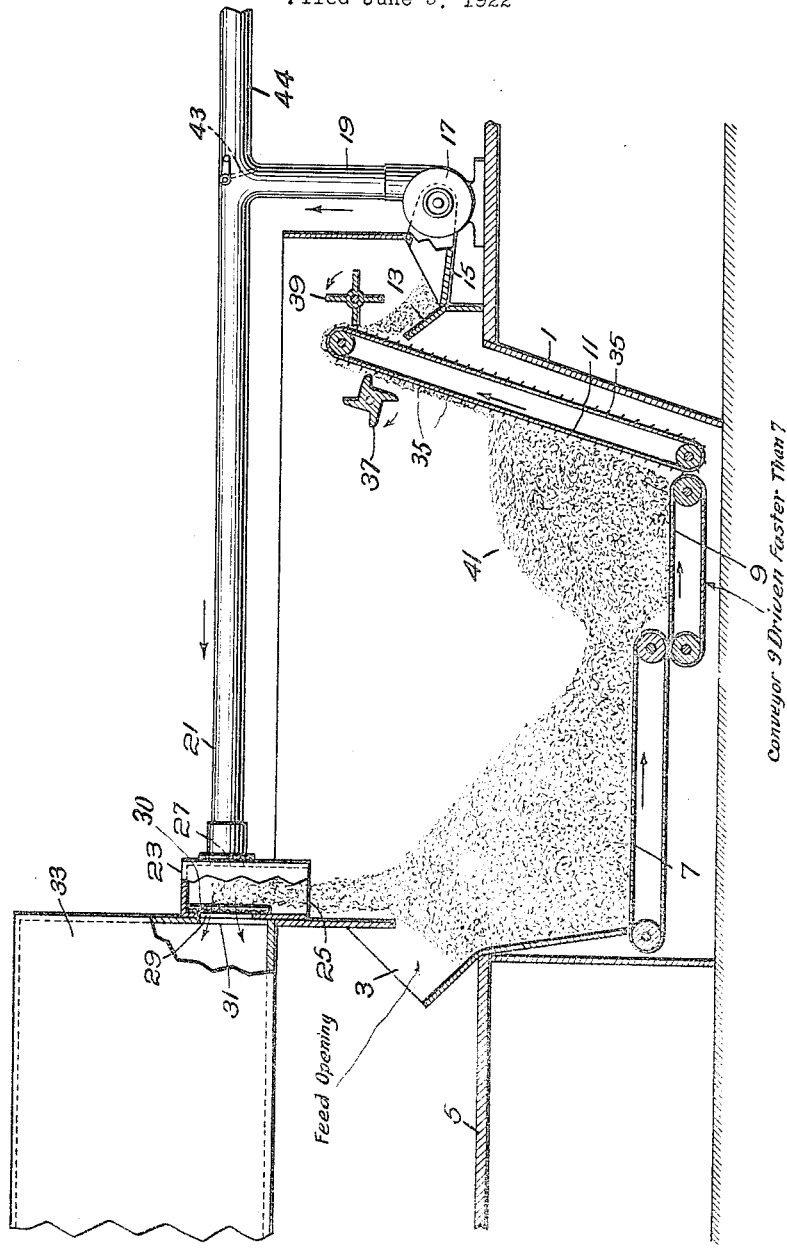

Patented Aug. 14, 1923.

1,465,050

UNITED STATES PATENT OFFICE.

WILLIAM S. KINSLEY, OF READING, MASSACHUSETTS, ASSIGNOR TO THE RUSSELL COMPANY, OF BOSTON, MASSACHUSETTS, A CORPORATION OF MASSACHUSETTS.

MIXING AND CLEANSING APPARATUS FOR TEXTILE STOCK.

Application filed June 3, 1922. Serial No. 565,784.

*To all whom it may concern:*

Be it known that I, WILLIAM S. KINSLEY, a citizen of the United States, and a resident of Reading, in the county of Middlesex and State of Massachusetts, have invented an Improvement in Mixing and Cleansing Apparatus for Textile Stock, of which the following description, in connection with the accompanying drawings, is a specification, like characters on the drawings representing like parts.

My invention pertains to apparatus for mixing and cleansing material and is particularly adapted for mixing and cleansing wool, shoddy, or like material.

My invention has among its objects the provision of means for performing the above operations expeditiously and in a thorough manner. My invention, however, will be best understood from the following description when read in light of the accompanying drawings of one specific embodiment of my invention submitted for illustrative purposes, while the scope of my invention will be more particularly pointed out in the appended claims.

In the drawings, I have shown more or less diagrammatically an apparatus arranged for mixing and cleansing wool or shoddy.

Referring to the drawings and to the preferred embodiment of my invention, I have shown a bin 1 having a delivery opening 3, through which the material hereinafter called wool, but which may be any material suitable to the apparatus, may be delivered from the platform 5. The material placed in the bin falls upon the conveyor 7, which moves it toward the center of the bin and delivers it upon a second conveyor 9. From the conveyor 9 it is delivered to the conveyor 11, which raises the material and places it in the hopper 13. The bottom of the hopper 13 communicates with the intake 15 of a fan blower 17, which discharges the wool into a conduit 19 and blows it therethrough into a conduit 21 leading to a box 23 above the left hand side of the bin 1.

The box 23 has an open bottom and is provided with an opening 27 in one of its side walls, the conduit 21 terminating at this opening. At its opposite side the box is provided with an opening 29 preferably screened as shown at 30 and in alignment with the opening 27 and communicating with an opening 31 in the end wall of the lint or dust collector 33. The wool when it reaches the box drops through the bottom thereof into the bin, while the air is directed away from the bin into the chamber 33.

The conveyors 7 and 9 may be of any suitable construction, for example, belt conveyors constructed of fabric or slats. The conveyor 11 may be of similar construction, preferably of slats, each of which, as will be understood by those skilled in the art, carries a number of spikes or the like 35 for engaging the wool and carrying it with the conveyor. Adjacent the top of the conveyor 11 is a rotating doctor 37 which acts to prevent an excess of material from passing over the top pulley of the conveyor while at the opposite side of the conveyor above the hopper 13 is the rapidly rotating stripper wheel 39 which acts to pull the wool off the spikes so that it may fall into said hopper.

Experience has shown that if a single conveyor be employed at the bottom of the bin a core of wool will form at the center of the bin and will slowly rotate without ever reaching the conveyor 11. To prevent this action I form the conveyor at the bottom of the bin into two or more sections, herein exemplified by the sections 7 and 9, and move each section slightly faster than the section immediately at its left. In the present embodiment of my invention, the section 9, therefore, moves slightly faster than the section 7. This will prevent the formation of the core above mentioned by pulling the mass of wool in the bin away from the center and will heap it against the conveyor 11 as is indicated at 41.

When the mixing and cleansing process is entirely complete, the stock may be removed from the bin in any desirable way. For example, a valve 43 may be located at the juncture of pipes 19 and 21 so as to divert the blast borne stock through a pipe 44, which leads to any desired apparatus.

Although I have described for purposes of illustration one specific embodiment of my invention, it is to be understood that I am not limited thereby to its specific mechanical details but that wide deviations may be made therefrom without departing from the spirit of my invention

Claims:

1. In an apparatus of the character described, a bin or the like into which material to be mixed is placed at one portion of said bin, means for causing said material to move to another portion of said bin, said means being constructed to operate to move the material for the last part of its travel across the bin more rapidly than for the first part of its travel, and means for returning said material to the first mentioned portion of said bin.

2. In an apparatus of the character described, a bin or the like into which material to be mixed is placed at one portion of said bin, means for causing said material to move to another portion of said bin, and said means being constructed to operate to move the material at an increasing speed across the bottom of said bin.

3. In an apparatus of the character described, a bin or the like into which material to be mixed may be placed at one side of said bin, a belt or like conveyor for carrying said material from said side toward the center of said bin, a second belt or like conveyor moving at a greater speed than the first conveyor and to which said first conveyor delivers the material at approximately the center of said bin and by which said material is carried towards the opposite side of said bin, and means for raising and returning said material to the first mentioned side of said bin.

4. In an apparatus for mixing wool or the like, a bin into which the material to be mixed is placed, a conveyor means for circulating said material from one portion of said bin to another portion, and said conveyor means being constructed to maintain a reduced bulk of material intermediate said portions, whereby all said material is circulated.

5. In an apparatus of the character described, a bin into which material to be mixed is placed at one portion of said bin, a belt or like conveyor for carrying said material towards another portion of said bin, and said conveyor being constructed in sections and having a section towards the last named portion of said bin which is driven at a greater speed than the section of said conveyor delivering material to it.

6. In an apparatus of the character described, a bin into which material to be mixed is placed at one portion of said bin, a belt or like conveyor adjacent said portion for carrying material away from said portion and delivering said material to a second belt or like conveyor which moves at a greater speed, and a conveyor means for raising said material from said bin and for returning it to said first mentioned conveyor.

7. In an apparatus of the character described, a bin into which material to be mixed is placed at one portion of said bin, a belt or like conveyor adjacent said portion for carrying material away from said portion and delivering said material to a second belt or like conveyor which moves at a greater speed, and a vertically arranged conveyor for raising said material from said bin to which said last named conveyor delivers said material.

8. In an apparatus for mixing wool or the like, the combination of a bin into which said material is placed and circulated across the bottom, up, across the top and down, of a conveyor at the bottom of said bin arranged to cause said material to travel faster across said bottom near the portion of the bin toward which it moves than it travels when leaving the portion of the bin from which it moves.

9. In an apparatus of the class described, a bin into which material may be placed, means for delivering said material from one portion of said bin to a conduit and blowing it therethrough by a blast of air, said conduit terminating above another portion of said bin, and a screen in front of said conduit.

10. In an apparatus of the class described, a bin into which material may be placed, means for delivering said material from one portion of said bin to a conduit and blowing it therethrough by a blast of air, a box having an open bottom above another portion of said bin and having aligned openings in opposite sides, said conduit entering said box through the opening of one of said sides and terminating adjacent said opening, and a screen covering the opening in said opposite side.

11. In an apparatus of the character described, a bin into which material may be placed, a conduit means through which a blast of air is caused to travel, means for delivering material from said bin to said conduit means, an opening in said conduit means for permitting said material to fall therefrom into said bin, and means adjacent said opening for separating said material from said air.

12. In an apparatus of the character described, a bin into which material may be placed, means for moving said material from one side of said bin to another side and delivering it to an air blast pipe, a separator into which said air blast pipe discharges, and means for delivering said material from said separator to the first side of said bin and for directing the air away from said bin.

13. In an apparatus of the character described, a mixing bin, a lint or like collector, a separator discharging into said collector, a blast pipe discharging into said separator, means for moving material from one portion to another portion of said bin and delivering it to said blast pipe, and means for causing said material to move from said separator to the first portion of said bin.

14. In an apparatus of the character described, a mixing bin, a lint or like collector having an opening covered by a screen, a blast pipe discharging against said screen and terminating in spaced relation therewith above one side of said mixing bin, and means for moving the material in said bin away from said side and delivering it to said blast pipe.

15. In an apparatus of the character described, a mixing bin, a lint or like collector having an opening covered by a screen, a blast pipe discharging against said screen and terminating in spaced relation therewith, and means for causing the material in said bin to be delivered to said blast pipe and to be returned to said bin from in front of said screen.

16. In apparatus of the character described, a material receiving hopper, a blower having its intake in communication with said hopper, a pipe with which the discharge of said blower communicates, a screen in front of the end of said pipe, a mixing bin, and means for delivering said material from said bin to said hopper.

17. In an apparatus of the character described, a mixing bin having at the bottom thereof a belt or like conveyor for carrying material from a side of said bin towards the center of said bin, a second belt or like conveyor moving at a greater speed than the first and to which said first conveyor discharges material at approximately the center of said bin, a third conveyor arranged for raising material from said bin and to which said second delivers material, an air blast pipe to which said third conveyor delivers material, said air blast pipe terminating above the side of said bin from which said first conveyor carries material, and a screen in front of the end of said pipe and spaced from said end.

In testimony whereof, I have signed my name to this specification.

WILLIAM S. KINSLEY.